United States Patent
D'Sa et al.

(10) Patent No.: US 6,493,821 B1
(45) Date of Patent: Dec. 10, 2002

(54) RECOVERY FROM WRITEBACK STAGE EVENT SIGNAL OR MICRO-BRANCH MISPREDICTION USING INSTRUCTION SEQUENCE NUMBER INDEXED STATE INFORMATION TABLE

(75) Inventors: Reynold V. D'Sa, Portland, OR (US); Robert F. Krick, Beaverton, OR (US); Rebecca E. Hebda, Sherwood, OR (US); Alan B. Kyker, Portland, OR (US)

(73) Assignee: Intel Corporation, Hillsboro, OR (US)

( * ) Notice: Subject to any disclaimer, the term of this patent is extended or adjusted under 35 U.S.C. 154(b) by 0 days.

(21) Appl. No.: 09/094,027

(22) Filed: Jun. 9, 1998

(51) Int. Cl.[7] .................................................. G06F 9/38
(52) U.S. Cl. .......................... 712/239; 712/244; 714/15
(58) Field of Search ........................... 712/23, 239, 244; 714/15

(56) References Cited

U.S. PATENT DOCUMENTS

| | | | |
|---|---|---|---|
| 5,381,533 A | 1/1995 | Peleg et al. | 712/215 |
| 5,574,871 A | 11/1996 | Hoyt et al. | 712/200 |
| 5,577,217 A | 11/1996 | Hoyt et al. | 712/200 |
| 5,584,001 A | 12/1996 | Hoyt et al. | 712/238 |
| 5,586,278 A * | 12/1996 | Papworth et al. | 712/235 |
| 5,604,877 A | 2/1997 | Hoyt et al. | 712/243 |
| 5,915,110 A * | 6/1999 | Witt et al. | 712/239 |

* cited by examiner

Primary Examiner—Kenneth S. Kim
(74) Attorney, Agent, or Firm—Kenyon & Kenyon

(57) ABSTRACT

A pipelined microprocessor is provided. The pipelined microprocessor includes a writeback stage which signals an event and sends a sequence number of an instruction which had the event. The event may be, for example, a fault, a trap or a branch misprediction. The pipelined microprocessor further includes a decode stage which stores recovering state information for respective instructions and is responsive to the writeback stage signaling the event by using the sequence number to access the stored information to retrieve recovery state information of the instruction which had the event. The recovery state information may include, for example, a pointer to a next linear instruction, a pointer to a branch target instruction, a branch prediction, or an instruction source. Event recovery micro-code determines a next instruction to execute using the recovery state information, the next instruction being executed after a machine recovery.

33 Claims, 4 Drawing Sheets

RECOVERY FROM WRITEBACK STAGE EVENT SIGNAL OR MICRO-BRANCH MISPREDICTION USING INSTRUCTION SEQUENCE NUMBER INDEXED STATE INFORMATION TABLE

FIELD OF THE INVENTION

The present invention is directed to improvements to an instruction pipeline in a microprocessor. In particular, the present invention is directed to a system and method for event and micro-branch misprediction recovery in an instruction pipeline.

BACKGROUND INFORMATION

Modern microprocessors include instruction pipelines in order to increase program execution speeds. Instruction pipelines typically include a number of units, each unit operating in cooperation with other units in the pipeline. One exemplary pipeline, found in, for example, Intel's Pentium® Pro microprocessor, includes an instruction fetch unit (IFU), an instruction decode unit (ID), a micro-code sequencer (MS), an allocation unit (ALLOC), an instruction execution unit (EX) and a write back unit (WB). The instruction fetch unit fetches program instructions. The instruction decode unit decodes macro-code instructions into a set number of micro-ops. However, if the macro-code instruction decodes into an a number of micro-ops that is greater than the set number, control is passed to the micro-code sequencer. The micro-code sequencer then provides the remaining micro-ops. The micro-code sequencer is also responsible for providing instructions to the execution unit when the processor must execute micro-code, for example, during event recovery. The allocation unit assigns a sequence number to each micro-op and stores each micro-op in an instruction pool. The execution unit executes the micro-ops. Finally, the write back unit retires instructions.

The instruction pipeline of Intel's Pentium® Pro microprocessor also includes branch prediction circuitry. In particular, when the instruction fetch unit fetches a branch instruction, branch prediction circuitry determines which instruction should be fetched next, i.e., the next linear instruction or the instruction at the branch target address.

During operation, the execution unit executes the micro-ops in the instruction pool in any order possible as data and execution units required for each micro-op becomes available. If the execution unit detects a branch instruction misprediction, the microprocessor must have a fast way to recover, i.e., to begin processing the proper instruction.

Accordingly, for each micro-op it processes, the allocation unit stores in a branch information table (BIT) a pointer to the next linear macro-code instruction (NLIP). Then, when the execution unit detects a branch misprediction, the execution unit signals the BIT to provide the appropriate instruction address with which to restart the instruction pipeline, e.g., the instruction pointed to by the NLIP or another address. Since information is stored in the BIT for each micro-op, the process of storing the information should be as efficient as possible. There is a need to further improve the efficiency of storing this information in the BIT.

In the Intel Pentium® Pro microprocessor, if the micro-code sequencer determines that the instruction pipeline should be restarted at the current instruction, the address of the current instruction must be calculated, i.e., the address of the current instruction is NLIP minus the length of the current instruction. Since macro-code instructions are not a uniform length, the instruction length of each instruction is passed in a data path, along with the instruction itself. Moreover, in the Intel Pentium® Pro microprocessor, other information needed by the micro-code sequencer, such as, for example, an indication as to whether a particular micro-op originated from the micro-code sequencer or another pipeline unit, is also transmitted in a dedicated data path. Data paths in microprocessors use expensive resources. Accordingly, there is a need to reduce the number of data paths associated with instruction pipeline restarts, particularly with respect to restarts associated with machine state recovery.

SUMMARY OF THE INVENTION

In accordance with an exemplary embodiment of the present invention, a pipelined microprocessor is provided. The pipelined microprocessor includes a writeback stage which signals an event and sends a sequence number of an instruction which had the event. The event may be, for example, a fault, a trap or a branch instruction misprediction. The pipelined microprocessor further includes a decode stage which stores recovery state information for respective instructions and responsive to the writeback stage signaling the event by using the sequence number to access the stored information to retrieve recovery state information of the instruction which had the event.

DETAILED DESCRIPTION

Instruction Pipeline Overview

Figure 1:
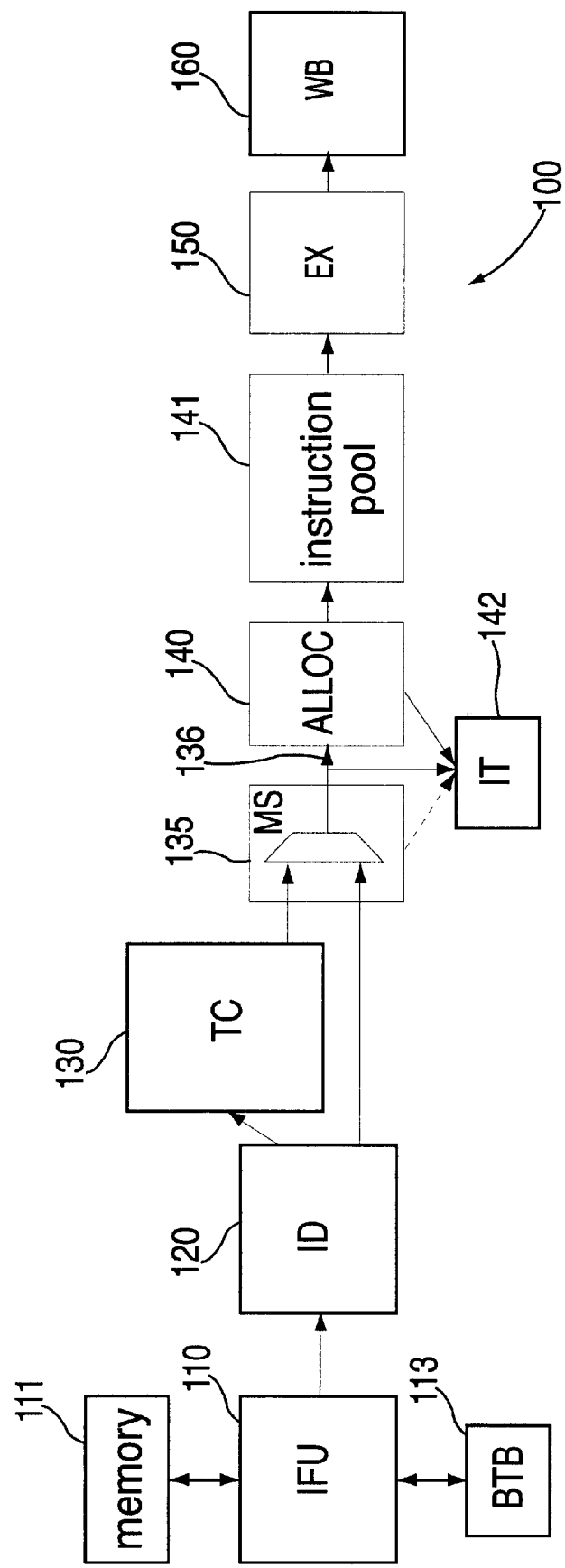
FIG. 1 is a block diagram of an exemplary instruction pipeline in accordance with the present invention.

Referring now to the drawings, and initially to FIG. 1, there is illustrated an exemplary embodiment of the present invention. This embodiment illustrates the present invention as applied to, for example, an instruction pipeline for processing Intel Architecture (i.e., x86) instructions (e.g., IA-32). As a person of ordinary skill in the art will understand, however, the present invention may be applied to instruction pipelines of other processor architectures, such as, for example, RISC and CISC architectures, or any processor architecture that includes the use of an instruction pipeline.

As illustrated in FIG. 1, in the exemplary embodiment of the present invention, the instruction pipeline 100 includes seven major stages or units, although each of the pipeline stages or units may actually be comprised of a number sub-stages. As illustrated, the instruction pipeline 100 includes an instruction fetch unit (IFU) 110, an instruction decode unit (ID) 120, a decoded cache unit(DC) 130, a micro-code sequencer (MS) 135, an allocation unit (ALLOC) 140, an execution unit (EX) 150, and a write-back unit (WB) 160. It will be understood, however, that the number of pipeline units in the pipeline 100 (and, the function of each unit, for that matter) may be different than that described in connection with the exemplary embodiment, depending on, for example, the microprocessor architecture. Furthermore, the term "unit" used throughout the present description may include (but is not limited to), for example, a stage, a discrete component (implemented in hardware, firmware, and/or software), a portion of a discrete component, an electrical circuit or portion thereof, etc.

The instruction fetch unit 110 fetches, for example, program macro-code instructions from memory 111 (e.g., main memory, cache memory, or any other storage or memory device) and pushes the fetched instructions into the pipeline 100 to the next downstream pipeline unit. Although in this exemplary embodiment, macro-code instructions are Intel Architecture instructions, other instruction types such as, for example, RISC or CISC instructions, or any other type of instruction may instead by fetched, depending on the specific architecture implemented.

During operation, the instruction fetch unit 110 fetches instructions from memory 111 in order to provide the pipeline 100 with a stream of instructions. If a fetched instruction is a branch instruction, the instruction fetch unit 110 must determine whether to next fetch the instruction at the next sequential address, or the instruction at the branch target address. Accordingly, the instruction fetch unit 110 uses branch prediction circuitry (BTB) 113, to predict whether or not a branch instruction will be taken or not taken. If the branch is predicted as "taken," the instruction fetch unit 110 fetches the instruction at the branch target address. If the branch is predicted as "not taken," the instruction fetch unit 110 fetches the next sequential instruction. In any event, the instruction fetch unit 110 pushes the fetched macro-code instruction to the next downstream pipeline unit. (The depth of the pipeline between the units within the pipeline 100 may depend on factors such as, for example, the particular design and architecture being used, the speed of units within the pipeline, etc.)

The instruction decode unit 120 receives the macro-code instruction from the instruction fetch unit 110 in, for example, first-in, first-out (FIFO) order. The instruction decode unit 120 then decodes the macro-code instructions into, for example, fixed-length RISC instructions called micro-ops or uops. Each macro-code instruction may decode to one or a number of micro-ops. Each of these micro-ops is assigned an identifier, e.g., a sequence number, by the allocation unit 140, and each is temporarily stored in an instruction pool 141. Of course, as will be understood by a person of ordinary skill in the art, in some microprocessor architectures, instructions do not require decoding. In a pipeline in such a system, therefore, an instruction decoder (i.e., instruction decode unit 120), for example, would not be needed.

In the exemplary embodiment, if the instruction decode unit 120 receives a macro-code instruction from the instruction fetch unit 110 that is complex, for example, a macro-code instruction that decodes to more than four micro-ops, the instruction decode unit 120 provides only the first four micro-ops. The micro-code sequencer 135 then provides the remaining micro-ops. (Also, as illustrated in FIG. 1, micro-ops provided to the instruction pool 141 by the instruction decode unit 130 pass through the micro-code sequencer 135.)

Figure 3:
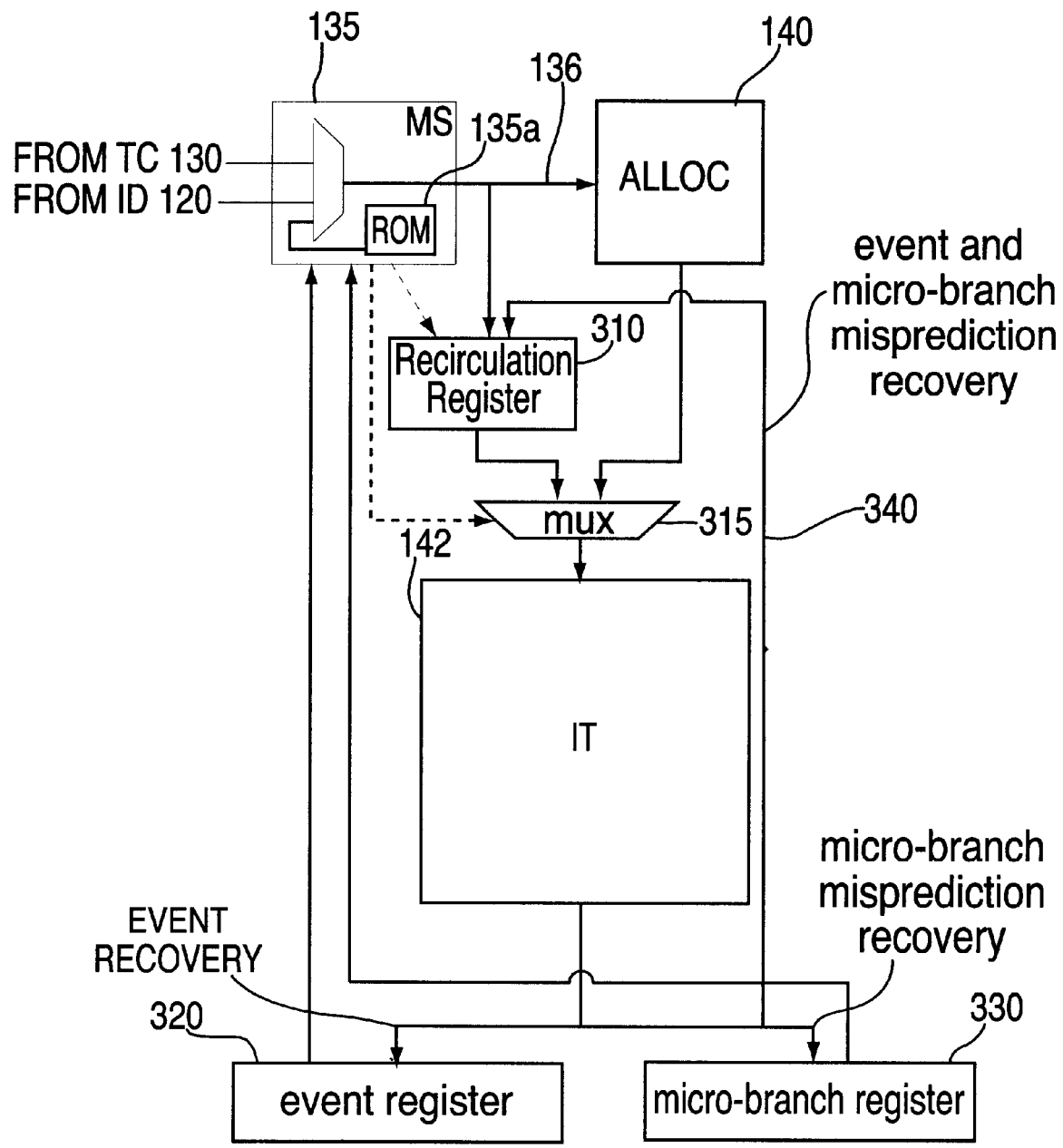
FIG. 3 is a flow diagram of the exemplary embodiment of the present invention.

The micro-code sequencer 135 of the exemplary embodiment transforms all complex macro-code instructions into a corresponding set of micro-ops (the corresponding micro-ops are retrieved, for example, from a ROM 135a illustrated in FIG. 3). In certain cases, if the decoded macro-code instruction includes a micro-branch instruction (a micro-op that is of branch type, i.e., a branch within the micro-code flow), the micro-code sequencer 135 predicts branch direction, i.e., whether the branch will be taken or not taken. In the exemplary embodiment, the micro-code sequencer 135 may make "static" branch predictions. In particular, the micro-code sequencer 135 may always predict, for example, that an unconditional micro-branch will be taken, an conditional backward micro-branch will be taken, and a conditional forward micro-branch will not be taken. (Other prediction schemes may, of course, be employed.) The micro-code sequencer 135 then transmits to the allocation unit 140 only those micro-ops along the predicted path.

In the exemplary embodiment of the present invention, the instruction pipeline 100 includes an additional source of program instructions. In particular, the decoded cache unit 130 stores instruction sequences in the form of micro-ops (i.e., instruction traces) in high speed cache memory in order to later provide these instructions to the allocation unit 140 for execution by the execution unit 150. The structure and operation of a decoded cache unit, such as, for example, a trace cache unit, is described in further detail in U.S. Pat. No. 5,381,533 to Peleg et al.

The decoded cache unit 130 controls whether the source for instructions entering the instruction pool 141 is the instruction fetch unit 110 (via the instruction decode unit 120) or the decoded cache unit 130. In particular, the decoded cache unit 130 snoops the instruction path 136 between the micro-code sequencer 135 and the allocation unit 140. If the decoded cache unit 130 recognizes that a particular instruction detected along the snooped the instruction path 132 corresponds to a "trace head" (i.e., the first instruction in an instruction trace) are stored at the decoded cache unit 130 (i.e., a decoded cache hit), the decoded cache unit 130 signals the instruction fetch unit 110 to discontinue fetching instructions. Instead, the decoded cache unit 130 provides the appropriate instructions to the allocation unit 140 from its cache memory. When decoded the cache unit 130 detects that further necessary instructions are not in cache (i.e., a decoded cache miss), the decoded cache unit 130 instructs the instruction fetch unit 110 to recommence fetching instructions at an address provided by the decoded cache unit 130. The decoded cache unit 130 then discontinues providing instructions to the allocation unit 140.

In the exemplary embodiment of the present invention, the execution unit 150 obtains instructions from the instruction pool 141. The execution unit 150 executes the micro-ops in the instruction pool 141 in any order possible as data and execution units required for each micro-op becomes available. Accordingly, the execution unit 150 is an out-of-order (OOO) portion of the pipeline. In other microprocessor architectures, the pipeline 100 could include, for example, an execution unit that processes instructions in-order, or in some predetermined order.

Finally, the write back unit 160 "retires" each executed micro-op. That is, the write back unit 160 commits the result of each micro-op execution to the processor's "architectural state" including, for example, the software-visible registers, flags, etc., in the order of original program flow. Thus, the write back unit 160 is an in-order rear end of the pipeline. Of course, in a microprocessor architecture in which instructions are executed in an in-order sequence, the instructions may not need to be "retired," thus, the pipeline 100 may not include a write back unit. Furthermore, even if the instructions are executed out-of order, it may be possible that the some (if not all) of the instructions be retired out-of order.

Figure 2:
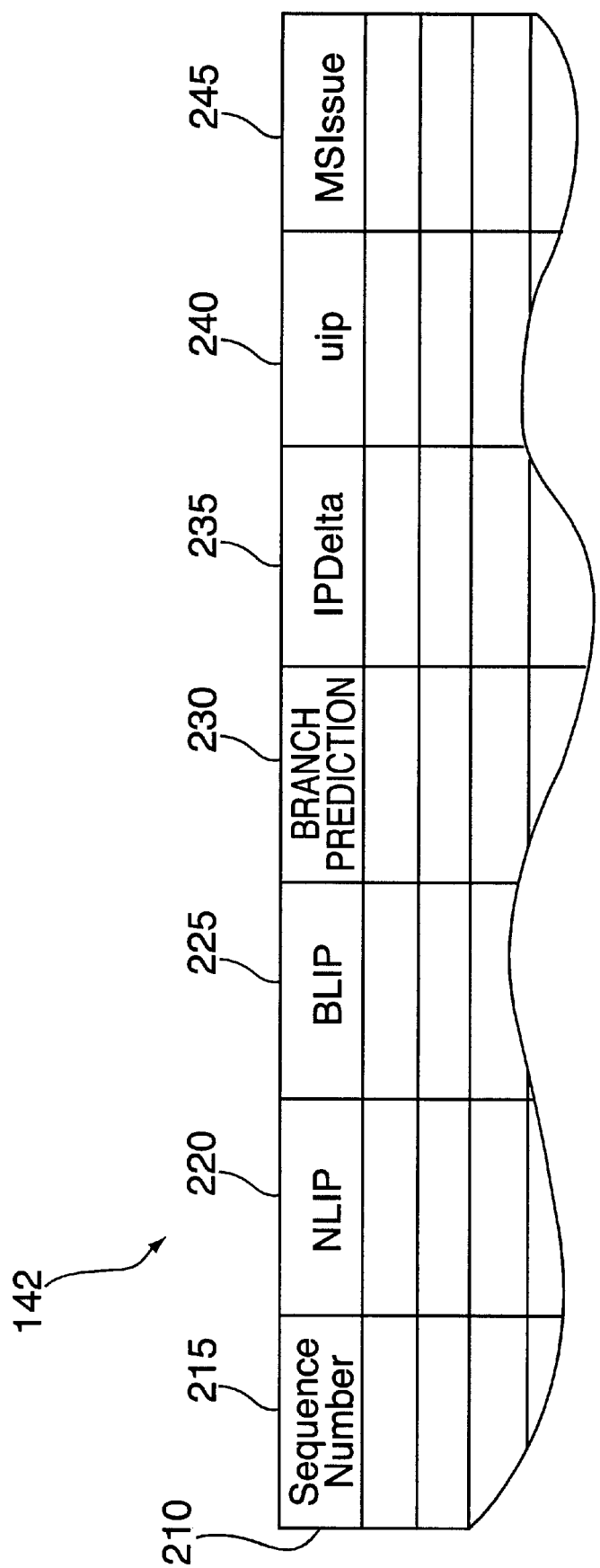
FIG. 2 illustrates the format of an exemplary branch information table.

In accordance with the present invention, certain information (i.e., recovery state information) regarding each micro-op processed in the instruction pipeline 100 is stored in a table. This information may be later used by machine micro-code, for example, during event recovery or during micro-branch misprediction recovery. In accordance with the exemplary embodiment of the present invention, an information table (IT) 142 stores information for some or all of the micro-ops processed. FIG. 2 illustrates the format of an exemplary IT 142.

IT Format:

Referring now to FIG. 2, each entry 210 in the IT 142 includes i) a sequence number field 215; ii) an NLIP field 220; iii) a BLIP field 225; iv) a branch prediction field 230; v) an IPdelta field 235; vi) a uip field 240; and vii) an MSIssue field 245. Each entry 210 corresponds to, for example, one micro-op, and is described in further detail below.

As described above, the allocation unit 140 assigns a sequence number to each micro-op. After each micro-op is assigned a sequence number, the IT 142 stores in the sequence number field 215 the sequence number assigned to the current micro-op. Since the sequence number uniquely identifies each micro-op, the sequence number field 215 may be used for indexing the IT 142.

In an alternative embodiment, the sequence number is not stored in the IT 142, and is simply used as an index into the table. Other indexing schemes may of course be employed.

In the NLIP field 220, the address of the next linear macro-code instruction (NLIP) (i.e., the address of the macro-code instruction following the macro-code instruction associated with the current micro-op in an instruction sequence) is stored.

If the macro-code instruction associated with the current micro-op is a branch instruction, the branch target address (BLIP) is stored in the BLIP field 225. Otherwise this field is marked as invalid by filling it in with, for example, "don't cares" (e.g., all zeroes, all ones, a preselected pattern of zeroes or ones, etc.), setting a flag, etc. (alternatively, the field may simply be ignored). In the exemplary embodiment, a branch "target" address is the address of an instruction to be executed if the branch is taken. For example, if the instruction is a branch to an instruction FOO, the address of FOO is the branch target address.

Additionally, if the macro-code instruction associated with the current micro-op is a branch instruction, an N-bit branch prediction indicator may be stored in the branch prediction field 230. For example, the branch indicator may indicate using a single bit whether the branch was predicted by upstream prediction circuitry as taken or not taken ("1" or "0", respectively).

The length of the macro-code instruction associated with the current micro-op is stored in the IPdelta field 235. Thus, the address of the macro-code instruction associated with the current micro-op may be determined by subtracting this length from the value stored in the NLIP field 220, i.e., current macro-code instruction address =NLIP−IPdelta. In an alternative embodiment, a current linear address pointer (CLIP) may be stored instead of the NLIP. In that case, the next linear address (i.e., the NLIP) may be calculated by adding the IPdelta to the CLIP.

In the exemplary embodiment of the present invention, the MSissue field 245 is an N-bit field indicating which unit issued the micro-op. For example, if the micro-op originated from the micro-code sequencer 135, a bit may be turned on (i.e., "1"). Otherwise, the bit may turned off (i.e., "0"), indicating that the micro-op originated either from the instruction decode unit 120 or the decoded cache unit 130.

If the bit in the MSissue field 245 is turned on, a pointer to the current micro-op is stored in the uip field 240.

An exemplary use of each of the above-mentioned fields is described below.

IT Maintenance:

FIG. 3 illustrates in detail portions of the instruction pipeline 100 pertinent to the maintenance and us e of the IT 142. As illustrated, in accordance with the exemplary embodiment of the present invention, a recirculation register 310 is provided. The recirculation register 310 is coupled to the path 136 (between the micro-code sequencer 135 and the allocation unit 140). The recirculation register 310 is also coupled to the IT 142 through a multiplexer 315. The allocation unit 140 is coupled to the IT 142 through the multiplexer 315.

In operation, information that is common to all of the micro-ops associated with a particular macro-code instruction is stored in the recirculation register 310. In particular, for each decoded macro-code instruction, the micro-code sequencer 135 provides the NLIP, IPdelta, BLIP, branch prediction bit, and the MSissue along path 136. This information is stored by the recirculation register 310, for example, under control of the micro-code sequencer 135. Then, for each of the micro-ops associated with the macro-code instruction, the allocation unit 140 provides to the multiplexer 315 any information unique to that particular micro-op such as, for example, uip and sequence number. The micro-code sequencer 135 then controls the multiplexer 315 in such a manner as to provide the information from the recirculation register 310, and the information from the allocation unit 140 to the IT 142.

Accordingly, in operation, the recirculation register 310 may be loaded, for example, only one time for each macro-code instruction processed. If a macro-code instruction decodes to several micro-ops, the micro-op specific information (e.g., sequence number and uip) is provided to the multiplexor 315 as the allocation unit 140 assigns each sequence number. Thus, one entry is stored in IT 142 for each micro-op of a macro-code instruction. Moreover, each entry associated with a particular macro-code instruction has, for example, the same information stored in the NLIP field, the BLIP field, the branch prediction bit field, the IPdelta field and the MSissue. Only the information in the sequence number field and the uip field are different.

As a person of ordinary skill will understand from the above description, the use of a recirculation register for assisting in the storage of data common to more than one micro-op saves valuable resources. Without the recirculation, if it was determined to be desirable to store the repeated information in a table for each of a number of micro-ops, a unit, such as, for example, a micro-code sequencer, may be required to copy the repeated information into the table for each of the micro-ops, rather than to simply trigger the storage into the table from the recirculation register. Accordingly, use of the recirculation register of the exemplary embodiment is more efficient.

In an alternative embodiment, a number of instructions may instead map to the same entry in the table, for example, if the data is the same for each of the instructions. This may, however, add to the complexity of indexing the table and retrieving the information when needed.

As will be understood by a person of ordinary skill, the IT 142 of the exemplary embodiment of the present invention centralizes the storage of information that may be necessary during event recovery and micro-branch misprediction recovery. In prior known systems, many of the pieces of information stored in the IT 142 of the exemplary embodiment were previously required to be transmitted between pipeline units along data paths during recovery. For example, in Intel's Pentium® Pro microprocessor, the BIT stored information only for branch misprediction recovery, and only NLIP information. Accordingly, information needed for event recovery was transmitted along data paths during recovery. The IT 142 in accordance with the present invention conserves valuable resources by reducing the number of data paths required in an instruction pipeline. Moreover, certain of the information stored in the IT 142 was previously derived "on-the-fly" by one or more pipeline units during recovery. With the IT 142, the information is always available and conveniently stored in the IT 142.

As illustrated in FIG. 3, in accordance with the exemplary embodiment, the recirculation register 310 is loaded with information from the IT 142 during both event recovery and micro-branch recovery (via data path 340) as is described in further detail below.

The pipeline 100 may also include additional registers for use during event recovery and branch misprediction recovery. For example, in the exemplary embodiment, two additional registers are included in the pipeline 100, an event register 320 and a micro-branch register 330. (Of course, the use of more or less registers is also possible.) Each of these registers is coupled to the IT 142 and to the micro-code sequencer 135. The event register 320 and the micro-branch register 330 are loaded with information from the IT 142 during event recovery and micro-branch misprediction recovery, respectively.

Figure 4:
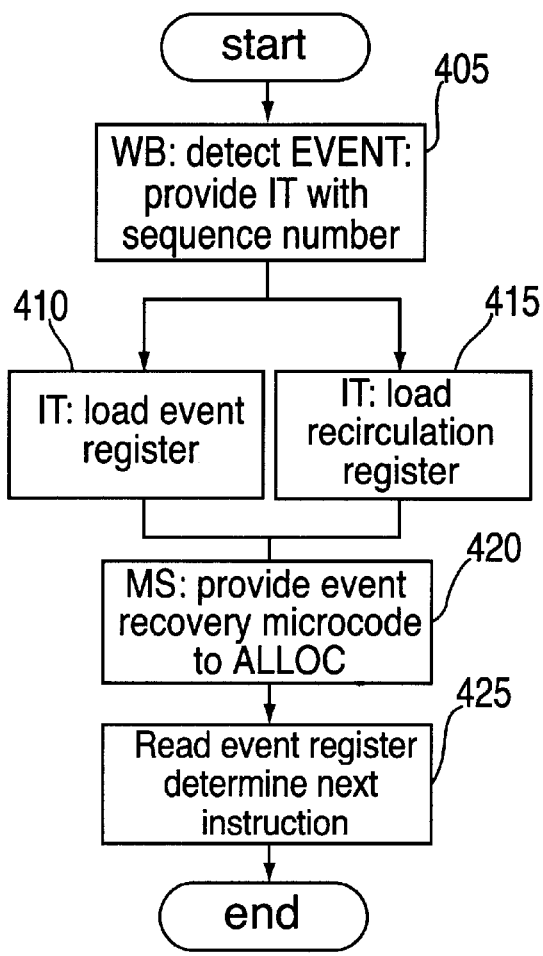
FIG. 4 is a flowchart of event recovery processing in accordance with the exemplary embodiment of the present invention.

Event Recovery:

The flowchart of FIG. 4 shows an exemplary process performed in connection with the IT 142 during event recovery. When the processor events, the write back unit 160 detects the event and provides the sequence number of the "current" micro-op (i.e., the micro-op that was next to be retired) to the IT 142 (step 405). Of course, in other embodiments, it is possible that the sequence number of a micro-op other than the current one be provided.

The IT 142 then loads the event register 320 (step 410) and the recirculation register 310 (step 415) with information pertinent to the instruction upon which the processor evented. In particular, in the exemplary embodiment, upon the occurrence of an event, the IT 142 reads the entry associated with the micro-op upon which the processor evented. The appropriate entry is selected by comparing the sequence number of the micro-op that evented to the sequence numbers in the sequence number field. The selected entry is then loaded into the event register 320 (step 410). The recirculation register 310 is also loaded with information from selected fields of that selected IT entry (step 415). For example, the NLIP, BLIP, branch prediction bit, IPdelta and MSISSUE are loaded into the recirculation register 310 in this embodiment. In the exemplary embodiment, the event register 320 and the recirculation register 310 are loaded simultaneously as illustrated in FIG. 4. However, the registers may be loaded at different times.

Next, the micro-code sequencer 135 provides the appropriate event recovery micro-code to the allocation unit 140 for execution (step 420). In particular, the micro-code sequencer 135 provides to the allocation unit 140 particular micro-ops associated with event recovery. For example, the particular micro-ops provided may relate to a particular event recovery code depending on the implementation and the particular event that occurred.

The allocation unit 140 assigns each micro-op a sequence number, and transmits each sequence number and uip to the multiplexer 315. For each micro-op, the micro-code sequencer 135 controls the multiplexer 315 in such a manner as to store the information from the recirculation register 310 and the information provided by the allocation unit 140 (sequence number and uip) in individual entries in the IT 142. This stored information may be needed if the processor events on one of the event recovery micro-ops.

After the event recovery micro-code is executed, the micro-code sequencer 135 reads the information stored in the event register 320 and determines which macro-code instruction should be executed once the machine recovers (step 425). In particular, if the event is a fault condition (e.g., a hardware problem is detected), and MSissue="0" (i.e., the instruction which evented did not originate from the micro-code sequencer 135) the micro-code may determine, for example, that the current macro-instruction should be re-executed. The micro-code then calculates the address of the current instruction from information stored in the event register 320, e.g., NLIP–IPdelta. This address is then transmitted to the instruction fetch unit 110, and the pipeline may be flushed and restarted. Alternatively (or in addition), the address may be transmitted to a pipeline unit other than the instruction fetch unit 110 if, for example, the instruction as the address is stored elsewhere in the instruction pipeline or external to the pipeline. For example, if the instruction is stored in a cache unit within the pipeline, the instruction may be transmitted to the cache for retrieval of the instruction.

If the event is a trap condition (e.g., an automatic procedure call initiated by some condition, such as, for example, an overflow condition), and MSissue="0," the micro-code may determine, for example, that the current instruction has completed and that the next instruction should be executed. In particular, if the macro-instruction upon which the machine evented is a branch instruction (the BLIP field has a well defined value), and the branch instruction was predicted as taken (as indicated by the branch prediction bit), the micro-code transmits BLIP (i.e., the branch target address) to the instruction fetch unit 110, for example. If the macro-instruction is not a branch instruction or the macro-instruction is not a branch instruction predicted as taken, NLIP is transmitted to the instruction fetch unit 110.

If, however, MSissue=1, i.e., the instruction originated from the micro-code sequencer 135, the micro-code utilizes the uip to restart. In particular, the micro-code sequencer 135 retrieves micro-ops from, for example, ROM 35a illustrated in FIG. 3, starting from, for example, the micro-op pointed to by the uip.

In any case, once the micro-code makes the determination as to which instruction should be executed next, the micro-code sequencer 135 utilizes the information in the event register 320 to determine the appropriate instruction address. The instruction address is then provided to the instruction fetch unit 110 (and/or the decoded cache unit 130) so that the instruction fetch unit 110 (or the decoded cache unit 130) can fetch the macro-code instruction.

Micro-Branch Misprediction Recovery

Figure 5:
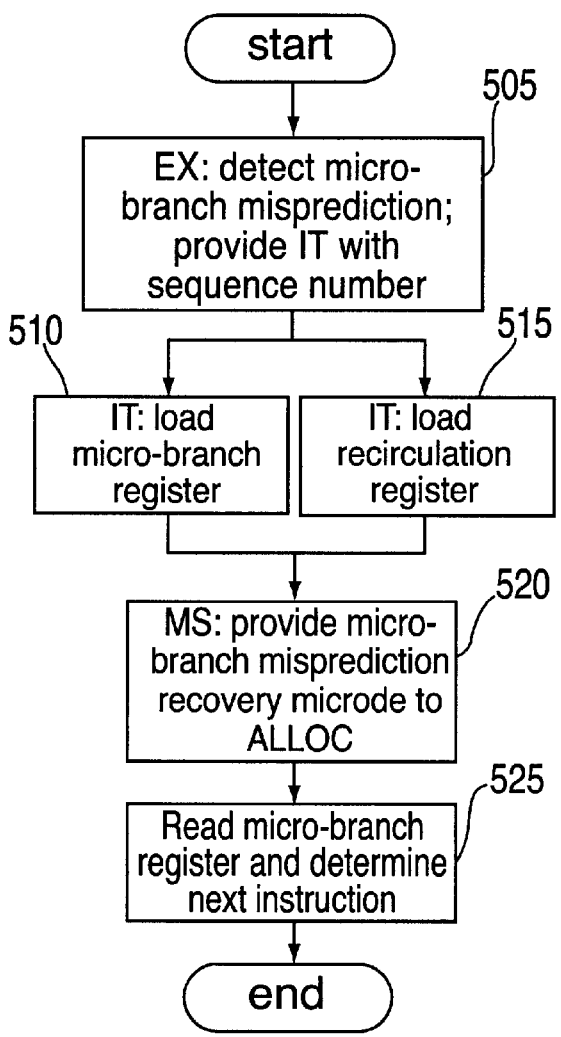
FIG. 5 is a flowchart of micro-branch misprediction recovery processing in accordance with the exemplary embodiment of the present invention.

Turning now to the flowchart of FIG. 5, the process performed in connection with the IT 142 during micro-branch misprediction recovery is illustrated. As described above, for certain micro-branch instructions, the micro-code sequencer 135 makes branch direction predictions. The micro-code sequencer 135 then provides the allocation unit 140 with micro-ops along only the predicted instruction path. Accordingly, it is possible that the micro-code sequencer 135 mispredicted a micro-branch instruction.

When the execution unit 150 detects a micro-branch misprediction (step 505), the execution unit 150 provides the sequence number of the mispredicted branch instruction to the IT 142 (step 505). Using the sequence number as an index, the IT 142 then loads the micro-branch register 330

(step 510) and the recirculation register 310 (step 520) with information pertinent to mispredicted micro-branch instruction from the appropriate entry. Information from the selected entry 210, such as, for example, the NLIP and IPdelta, is then loaded into the micro-branch register 330 (step 510). Additionally (either simultaneously or at a different time), the recirculation register 310 is loaded with information from selected fields of the IT 142 entry (step 515). For example, the NLIP, BLIP, branch prediction bit, IPdelta and MSISSUE are loaded into the recirculation register 310 in this embodiment.

Next, the micro-code sequencer 135 provides the appropriate micro-branch misprediction micro-code to the allocation unit 140 for execution (step 520). In particular, the micro-code sequencer 135 provides to the allocation unit 140 particular micro-ops associated with micro-branch misprediction recovery. The allocation unit 140 assigns each micro-op a sequence number, and transmits each sequence number and uip to the multiplexer 315. For each micro-op, the micro-code sequencer 135 controls the multiplexor 315 in such a manner as to store the information from the recirculation register 310 and the information provided by the allocation unit 140 (sequence number and uip) in individual entries in the IT 142. This stored information may be needed if the processor events on one of the micro-code micro-ops.

Finally, after the branch misprediction recovery micro-code is executed, the micro-code sequencer 135 reads the micro-branch register 330 and determines which macro-code instruction should be executed once the machine recovers based on, for example, the information stored in the micro-branch register 330 (step 525).

What is claimed is:

1. A pipelined microprocessor, comprising:
  a writeback stage that signals an event and sends a sequence number of an instruction which had the event; and
  a decode stage including a storage structure to store recovery state information for respective instructions and responsive to the writeback stage signaling the event, the decode stage using the sequence number to access the storage structure to retrieve from the storage structure recovery state information of the instruction which had the event, the recovery state information including at least one of a pointer to a next linear instruction, a pointer to a branch target instruction, a branch prediction, and an instruction source indicator, the decode stage determining a next instruction to execute using the recovery state information, the next instruction being executed after an event recovery;
  wherein the event is one of a fault, a trap and a branch instruction misprediction.

2. The pipelined microprocessor of claim 1, wherein the storage structure includes a table storing recovery state information of a plurality of instructions.

3. The pipelined microprocessor of claim 1, wherein the decode stage decodes a first instruction into one or more second instructions, and the pipelined microprocessor further comprises:
  a first register to store state information related to the first instruction, wherein the means for storing recovery state information includes a table having a plurality of entries, each of the plurality of entries receiving the state recovery information related to the first instruction from the first register, each of the plurality of entries corresponding to a respective one of the one or more second instructions.

4. A method for recovering from a condition in an instruction pipeline, comprising:
  storing in a first register information related to a first instruction, the first instruction decoding to one or more second instructions;
  for each of the one or more second instructions, receiving a respective assigned identifier;
  for each of the one or more second instructions, storing in a respective one of a plurality of table entries the information stored in the first register as a function of the received respective assigned identifier;
  detecting the condition on a first one of the one or more second instructions;
  loading the first register with a first portion of a first one of the plurality of table entries, the first one of the plurality of table entries being retrieved as a function of the respective identifier assigned to the first one of the one or more second instructions; and
  loading a second register with a second portion of the first one of the first plurality of entries.

5. A system for storing information in an instruction pipeline, the instruction pipeline including a plurality of pipeline units, a first one of the plurality of pipeline units decoding a first instruction into one or more second instructions, and a second one of the plurality of pipeline units assigning a first identifier to each of the one or more second instructions, comprising:
  a first register for storing information related to the first instruction; and
  a table having a first plurality of entries, each of the first plurality of entries receiving the stored information from the first register, each of the first plurality of entries corresponding to a respective one of the one or more second instructions and being indexed by the first respective identifier assigned to the corresponding respective one of the one or more second instructions.

6. The system of claim 5, wherein a third one of the plurality of pipeline units is capable of detecting an event condition, and wherein the first register is loaded with a portion of a first one of the first plurality of entries when the third one of the plurality of pipeline units detects the event condition on a first one of the one or more second instructions, the first one of the first plurality of entries being indexed by the respective identifier assigned to the first one of the one or more second instructions.

7. The system of claim 6, wherein at least one of the plurality of pipeline units provides a plurality of event recovery instructions to the pipeline when the third one of the plurality of pipeline units detects the event condition on the first one of the one or more second instructions, wherein the second one of the plurality of pipeline units assigns each of the plurality of event recovery instructions a second respective identifier, and wherein the table includes a second plurality of entries, each of the second plurality of entries receiving the portion of the first one of the first plurality of entries from the first register, each of the second plurality of entries corresponding to a respective one of the plurality of event recovery instructions and being indexed by the second respective identifier assigned to the corresponding respective one of the plurality of event recovery instructions.

8. The system of claim 5, wherein the first instruction is a macro-code instruction and each of the one or more second instructions is a micro-code instruction.

9. The system of claim 5, wherein the first respective identifier is a sequence number.

10. A system for recovering from a condition in an instruction pipeline, the instruction pipeline including a plurality of pipeline units, a first one of the plurality of pipeline units decoding a first instruction into one or more second instructions, and a second one of the plurality of pipeline units assigning a first respective identifier to each of the one or more second instructions, a third one of the plurality of pipeline units capable of detecting the condition, comprising:

a first register for storing information related to the first instruction;

a table having a first plurality of entries, each of the first plurality of entries receiving the stored information from the first register, each of the first plurality of entries corresponding to a respective one of the one or more second instructions and being indexed by the first respective identifier assigned to the corresponding respective one of the one or more second instructions;

a second register, wherein the second register is loaded with a first portion of a first one of the first plurality of entries when the third one of the plurality of pipeline units detects the condition, the condition occurring on a first one of the one or more second instructions, the first one of the first plurality of entries being indexed by the respective identifier assigned to the first one of the one or more second instructions.

11. The system of claim 10, wherein the first register is loaded with a second portion of the first one of the plurality of entries.

12. The system of claim 11, wherein the detected condition is an event condition, wherein at least one of the plurality of pipeline units provides a plurality of event recovery instructions to the pipeline when the third one of the plurality of pipeline units detects the event condition on the first one of the one or more second instructions, wherein the second one of the plurality of pipeline units assigns each of the plurality of event recovery instructions a second respective identifier, and wherein the table includes a second plurality of entries, each of the second plurality of entries receiving the second portion of the first one of the first plurality of entries from the first register, each of the second plurality of entries corresponding to a respective one of the plurality of event recovery instructions and being indexed by the second respective identifier assigned to the corresponding respective one of the plurality of event recovery instructions.

13. The system of claim 10, wherein the detected condition is a micro-branch misprediction condition.

14. The system of claim 10, wherein the first respective identifier is a sequence number.

15. A method for storing information in an instruction pipeline, the instruction pipeline including a plurality of pipeline units, a first one of the plurality of pipeline units decoding a first instruction into one or more second instructions, and a second one of the plurality of pipeline units assigning a first respective identifier to each of the one or more second instructions, comprising the steps of:

storing in a first register information related to the first instruction;

for each of the one or more second instructions, receiving the assigned identifier; and for each of the one or more second instructions, storing in a respective one of a plurality of table entries the information stored in the first register as a function of the received assigned identifier.

16. The method of claim 15, further comprising the steps detecting an event condition on a first one of the one or more second instructions;

receiving a second assigned identifier, the second assigned identifier being assigned to the first one of the one or more second instructions;

selecting one table entry from the plurality of table entries as a function of the second assigned identifier; and storing a portion of the selected one table entry in the first register.

17. The method of claim 16, further comprising the steps of:

receiving from one of the plurality of pipeline units a plurality of event recovery instructions;

assigning each of the plurality of event recovery instructions a third respective identifier;

for each of the plurality of event recovery instructions, receiving the assigned third respective identifier; and for each of the plurality of event recovery instructions, storing in a second respective one of the plurality of table entries the information stored in the portion of the selected one table entry from the first register as a function of the received assigned third respective identifier.

18. The method of claim 15, further comprising the steps detecting a micro-branch misprediction condition on a first one of the one or more second instructions;

receiving a second assigned identifier, the second assigned identifier being assigned to the first one of the one or more second instructions;

selecting one table entry from the plurality of table entries as a function of the second assigned identifier; and storing a portion of the selected one table entry in the first register.

19. The method of claim 18, further comprising the steps of:

receiving from one of the plurality of pipeline units a plurality of micro-branch misprediction recovery instructions;

assigning each of the plurality of micro-branch misprediction recovery instructions a third respective identifier;

for each of the plurality of micro-branch misprediction recovery instructions, receiving the assigned third respective identifier; and for each of the plurality of micro-branch misprediction recovery instructions, storing in a second respective one of the plurality of table entries the information stored in the portion of the selected one table entry from the first register as a function of the received assigned third respective identifier.

20. A method for recovering from a condition in an instruction pipeline, the instruction pipeline including a plurality of pipeline units, a first one of the plurality of pipeline units decoding a first instruction into one or more second instructions, and a second one of the plurality of pipeline units assigning a first respective identifier to each of the one or more second instructions, comprising the steps of:

storing in a first register information related to the first instruction;

for each of the one or more second instructions, receiving the assigned identifier; and for each of the one or more second instructions, storing in a respective one of a plurality of table entries the information stored in the first register as a function of the received assigned identifier; and detecting the condition on a first one of the one or more second instructions;

loading the first register with a first portion of a first one of the plurality of table entries, the first one of the plurality of table entries being retrieved as a function of the identifier assigned to the first one of the one or more second instructions; and loading a second register with a second portion of a first one of the first plurality of entries.

21. The method of claim 20, wherein the condition is an event condition, further comprising the steps of:

receiving from one of the plurality of pipeline units a plurality of event recovery instructions;

for each of the plurality of event recovery instructions, assigning a second respective identifier; and for each of the plurality of event recovery instruction, storing in a second respective one of the plurality of table entries the first portion of the first one of the plurality of table entries from the first register.

22. The system of claim 20, wherein the condition is an micro-branch misprediction condition, further comprising the steps of:

receiving from one of the plurality of pipeline units a plurality of micro-branch misprediction recovery instructions;

for each of the plurality of micro-branch misprediction recovery instructions, assigning a second respective identifier; and for each of the plurality of micro-branch recovery instructions, storing in a second respective one of the plurality of table entries the first portion of the first one of the plurality of table entries from the first register.

23. A microprocessor which decodes a macro-instruction into an initial micro instruction and one or more non-initial micro instructions, the microprocessor comprising:

a data path which carries state recovery information for the initial micro instruction but not for at least one of the non-initial micro instructions; and a recirculation register, coupled to the data path, which stores the state recovery information for the initial micro instruction, and provides that state recovery information for the at least one non-initial micro instruction for which state recovery information is not carried by the data path.

24. The microprocessor of claim 23, further comprising:

a micro instruction information table which stores state recovery information for a plurality of macro-instructions, the micro instruction information table coupled to receive from the data path and store state recovery information of an initial micro instruction of a given macro-instruction, and coupled to receive from the recirculation register store state recovery information for a non-initial micro instruction of the given macro-instruction.

25. The microprocessor of claim 24, wherein:

state recovery information for each micro instruction presently in the microprocessor is stored in a unique location in the micro instruction information table.

26. The microprocessor of claim 25, further comprising:

means for assigning to each micro instruction a unique instruction number which is used to address the micro instruction information table.

27. The microprocessor of claim 24, wherein:

all micro instructions of a given macro-instruction map to a same entry in the micro instruction information table.

28. The microprocessor of 24, further comprising:

means, responsive to an event, for executing event recovery micro-code micro instructions;

means, responsive to the means for executing event recovery micro-code micro instructions, for providing from the micro instruction information table to the recirculation register previously stored state recovery information of a prior micro instruction which was prior to the event; and means, coupled to the recirculation register and the micro instruction table, for storing the state recovery information of the prior micro instruction from the recirculation register into the micro instruction information table for the even recovery micro code micro instructions.

29. The microprocessor of claim 28, wherein the event is a trap and the prior micro instruction is the eventing micro instruction.

30. The microprocessor of claim 28, wherein the event is a fault and the prior micro instruction is a micro instruction which was retired prior to the eventing micro instruction.

31. The microprocess of claim 28, wherein the even is a microbranch misprediction in a micro code flow.

32. A system for recovering from a condition in an instruction pipeline, the system comprising:

a first register for storing information related to a first instruction;

a table having a first plurality of entries, each of the first plurality of entries receiving the stored information from the first register, each of the first plurality of entries corresponding to a respective one of one or more second instructions and being indexed by a first respective identifier assigned to the corresponding one of the one or more second instructions, the first instruction being decoded into the one or more second instructions; and a second register, wherein the second register is loaded with a first portion of a first one of the first plurality of entries when a pipeline unit of the instruction pipeline detects the condition, the condition occurring on a first one of the one or more second instruction, the first one of the first plurality of entries being indexed by the respective identifier assigned to the first one of the one or more second instructions.

33. A method for storing information in an instruction pipeline, comprising:

storing in a first register information related to a first instruction, the first instruction decoding into one or more second instructions;

for each of the one or more second instructions, receiving a respective assigned identifier; and for each of the one or more second instructions, storing in a respective one of a plurality of table entries the instruction stored in the first register as a function of the received respective assigned identifier.

* * * * *